Dec. 15, 1925.
M. W. WEBSTER
NUT LOCK
Filed May 22, 1924
1,565,609
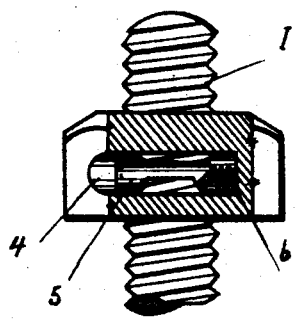
Fig. 6.
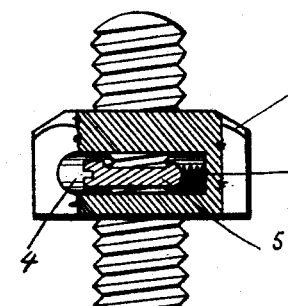
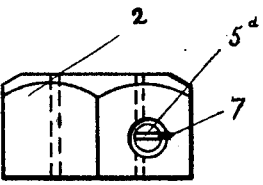
Fig. 2.
Fig. 4.
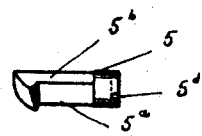
Fig. 5.
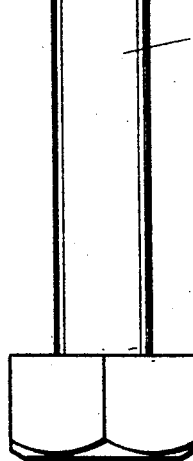
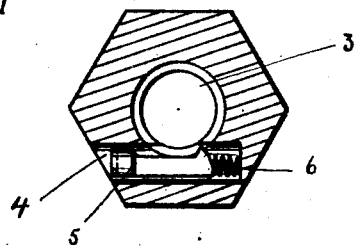
Fig. 3.
Fig. 1.
Milton Ward Webster Patented Dec. 15, 1925.

1,565,609

UNITED STATES PATENT OFFICE.

MILTON WARD WEBSTER, OF TORONTO, ONTARIO, CANADA, ASSIGNOR TO JOHN A. CARTER, OF TORONTO, CANADA.

NUT LOCK.

Application filed May 22, 1924. Serial No. 715,174.

*To all whom it may concern:*

Be it known that I, MILTON WARD WEBSTER, a British subject, residing at the city of Toronto, in the county of York and Province of Ontario, Dominion of Canada, have invented certain new and useful Improvements in Nut Locks; and I hereby declare that the following is a full, clear, and exact description of the same.

In my Letters Patent of the United States numbered 1,367,648 dated February 8, 1921, I have shown and described a nut lock comprising a nut having a threaded bore for the bolt and a recess arranged transversely of the bore and communicating therewith and a pin provided with lateral projections slidingly fitted within the recess engaging the threads of the bolt and a hollow nipple inserted in the recess for holding the pin in position.

The object of my present invention is to construct a nut lock similar in action to that described in the before-mentioned Letters Patent but without the use of a nipple or lateral projections on the pin.

In explanation of the means by which I carry out my object reference is to be had to the accompanying drawings, in which:—

Fig. 1 is a sectional elevation showing a bolt, nut and the improved locking device, Fig. 2 is an elevation of the nut, Fig. 3 is a sectional view of the nut and locking device, Fig. 4 is a perspective view of the locking pin, Fig. 5 is a similar view to Fig. 4 showing the two cut-away portions, and Fig. 6 is a sectional elevation showing the bolt and nut with the locking pin in released position.

1 is a bolt of usual construction and 2 is the nut therefor having a threaded bore 3 through which enters the threaded portion of the bolt. Within the nut 2 is a recess or cavity 4 arranged transversely of the bore and communicating therewith, and within the recess or cavity 4 is a locking pin 5 having cut-away parts $5^a$ and $5^b$ and at the inner end of the pin is an inclined tooth or retention member $5^c$ projecting into the bore a depth equal to that of the bolt threads and at the outer end of the pin is a slot $5^d$ adapted to receive a screw driver. Between the inner end of the locking pin and the inner end of the recess or cavity is a spring 6 to yieldingly resist the inward movement of the pin and normally retain the tooth or retention member in contact with the bolt threads.

In some industries such as the manufacture of automobiles, where nuts are put on by machinery, it is necessary that the locking pin 5 should be correctly positioned in the recess or cavity 4 for the turning on of the nut. To meet this requirement the locking pin 5 is inserted in the recess or cavity 4 and forced inward until the tooth or retention member is properly positioned in the bore. A burr is then made on the circumference of the recess or cavity 4, a portion of the burr being forced into the slot $5^d$ as shown at 7, Fig. 2, to prevent the turning of the pin 5 in the recess. The burr co-operates with the spring in maintaining the retention member in engagement with the bolt threads; it prevents the accidental withdrawal of the pin from the recess; and, in conjunction with the slot $5^d$, indicates the locked or unlocked position of the pin.

To prevent the accidental turning of the pin 5 the tooth or retention member $5^c$ is inclined upwardly towards the cut-away part $5^b$, which keeps the tooth or retention member at all times in contact with the thread of the bolt unless forced inwardly and released in the manner to be later described.

In operation, when the nut is turned on the bolt the spring 6 permits of the movement of the locking pin in an inward direction freeing the tooth or retention member from engagement with the bolt threads. When the nut is turned in an opposite direction the spring forces the tooth or retention member $5^c$ against the bolt threads and prevents the turning of the nut in an off direction.

To disengage the locking pin, a screw driver is inserted in the slot $5^d$ and the locking pin 5 pressed inwardly and given a quarter turn to the position shown in Fig. 6. The pin 5 is provided with a cut-away part $5^b$ so that when turned this cut-away part $5^b$ is uppermost, clearing the bolt thread and allowing for the free turning movement of the nut.

Having thus fully described my invention what I claim as new and desire to secure by Letters Patent is:

A nut having a threaded bore for the bolt, a recess arranged transversely of the bore and communicating therewith, in combination with a pin slidingly and rotatably fitted within the recess, said pin having at one end an inclined retention member for engaging the threads of the bolt when the pin is turned to the locking position, and at the other end a slot for the turning of the pin in the recess, said pin having between its ends a clearance for the bolt, and a burr at the outer end of the transverse recess for engaging in the slotted end of the pin and maintaining the inclined retention member in engagement with the bolt threads.

Dated at the said city of Toronto, this 15th day of May, A. D. 1924.

MILTON WARD WEBSTER.